(12) United States Patent
Erharter et al.

(10) Patent No.: US 12,485,934 B2
(45) Date of Patent: *Dec. 2, 2025

(54) HYBRID CABLE/RAIL TRANSPORTATION SYSTEM

(71) Applicant: LEITNER S.P.A., Vipiteno (IT)

(72) Inventors: Nikolaus Erharter, San Candido (IT); Hartmut Wieser, Racines (IT); Giuseppe Conte, Bolzano (IT)

(73) Assignee: Leitner S.P.A., Vipiteno (IT)

( * ) Notice: Subject to any disclaimer, the term of this patent is extended or adjusted under 35 U.S.C. 154(b) by 1031 days.

This patent is subject to a terminal disclaimer.

(21) Appl. No.: 17/615,418

(22) PCT Filed: Jun. 5, 2020

(86) PCT No.: PCT/IB2020/055325
§ 371 (c)(1),
(2) Date: Nov. 30, 2021

(87) PCT Pub. No.: WO2020/245796
PCT Pub. Date: Dec. 10, 2020

(65) Prior Publication Data
US 2022/0227401 A1    Jul. 21, 2022

(30) Foreign Application Priority Data
Jun. 5, 2019   (IT) .......................... 102019000008157

(51) Int. Cl.
*B61B 15/00* (2006.01)
*B61B 7/00* (2006.01)
(Continued)

(52) U.S. Cl.
CPC ................ *B61B 15/00* (2013.01); *B61B 7/00* (2013.01); *B61B 7/04* (2013.01); *B61B 10/027* (2013.01);
(Continued)

(58) Field of Classification Search
CPC ......... B61B 15/00; B61B 7/00; B61B 12/122; B61B 12/022; B61B 1/00; B61B 7/04;
(Continued)

(56) References Cited

U.S. PATENT DOCUMENTS 4,425,851 A * 1/1984 Long ........................ B61B 13/04
                                                     104/20
11,492,021 B2 * 11/2022 Erharter .................... B61B 1/00
(Continued)

FOREIGN PATENT DOCUMENTS

CN         104442835 A       3/2015
DE          378 915 C        8/1923
(Continued)

OTHER PUBLICATIONS

Office Action and Search Report for Chinese Application No. 202080041632.6 dated Feb. 11, 2023 (5 pages).
(Continued)

*Primary Examiner* — Zachary L Kuhfuss
(74) *Attorney, Agent, or Firm* — Neal, Gerber & Eisenberg LLP

(57) ABSTRACT

A hybrid cable/rail transportation system comprising: at least one portion of the system configured as a cable transportation system comprising at least one supporting cable; at least one portion of the system configured as a rail transportation system comprising at least one rail, wherein the system portion configured as a cable transportation system is upstream and/or downstream of the system portion configured as a rail transportation system; a plurality of transportation units wherein each transportation unit comprises a cabin; a first trolley coupled to the supporting cable; a second trolley coupled to the rail; wherein each cabin comprising a roof provided with a connection device configured to couple with the first trolley along the system
(Continued)

portion configured as a cable transportation system and with the second trolley along the system portion configured as a rail transportation system.

20 Claims, 3 Drawing Sheets

(51) Int. Cl.
| | | |
|---|---|---|
| *B61B 7/04* | (2006.01) | |
| *B61B 10/02* | (2006.01) | |
| *B61B 12/00* | (2006.01) | |
| *B61B 12/02* | (2006.01) | |
| *B61B 12/12* | (2006.01) | |
| *B61B 1/00* | (2006.01) | |

(52) U.S. Cl.
CPC .......... *B61B 12/002* (2013.01); *B61B 12/022* (2013.01); *B61B 12/122* (2013.01); *B61B 1/00* (2013.01)

(58) Field of Classification Search
CPC ........... B61B 3/00; B61B 12/002; B61B 1/02; B61B 10/027; B61B 12/00; B61F 1/14; B61D 15/00
USPC .......................................................... 104/87
See application file for complete search history.

(56) References Cited

U.S. PATENT DOCUMENTS

| 11,801,875 | B2* | 10/2023 | Erharter | .................... B61F 5/50 |
|---|---|---|---|---|
| 2017/0080953 | A1* | 3/2017 | Zhao | ........................ B61B 1/00 |
| 2018/0079431 | A1* | 3/2018 | Erharter | ................. B61B 12/00 |
| 2020/0385029 | A1* | 12/2020 | Erharter | .................... B61B 7/04 |
| 2021/0031811 | A1* | 2/2021 | Erharter | ................. B61B 15/00 |

FOREIGN PATENT DOCUMENTS

| DE | 518 644 C | 2/1931 |
|---|---|---|
| DE | 2132795 | 1/1973 |
| DE | 520463 | 8/1993 |
| FR | 3 001 432 A1 | 8/2014 |
| KR | 101 497 481 B1 | 3/2015 |
| WO | WO 2015/077806 A1 | 6/2015 |

OTHER PUBLICATIONS

Notification Concerning Submission, Obtention or Transmittal of Priority Document for International Application No. PCT/IB2020/055325 dated Oct. 9, 2020.
International Search Report and Written Opinion for International Application No. PCT/IB2020/055325 dated Sep. 16, 2020.
Office Action and Search Report for Colombian Patent Application No. NC2021/0018265 dated Jun. 30, 2023 (7 pages).

\* cited by examiner

HYBRID CABLE/RAIL TRANSPORTATION SYSTEM

PRIORITY CLAIM

This application is a national stage application of PCT/IB2020/055325, filed on Jun. 5, 2020, which claims the benefit of and priority to Italian Patent Application No. 102019000008157, filed on Jun. 5, 2019, the entire contents of which are each incorporated by reference herein.

TECHNICAL FIELD

This disclosure relates to a transportation system. In particular, this disclosure relates to a hybrid cable/rail transportation system wherein the transportation units travel along the path where we find in succession, without transport interruption, a cable system portion and a rail system portion. The expression "without transport interruption" refers to the fact that passengers do not have to get off the transportation unit at the end of the cable transportation section and onto another transportation unit in order to travel on the rail transportation section. However, "without transport interruption" does not mean that the transportation units cannot be stopped at stations located along the path.

In addition, this disclosure relates to a trolley configured to support the transportation units along the system portion configured as a rail transportation system.

BACKGROUND

The transportation systems wherein people or things are transported along a path inside transportation units fed in succession can be divided into two different types that are alternatively used depending on various environmental conditions. A first type of system corresponds to cable transportation systems wherein the transportation units are supported suspended from at least one supporting cable. In this type of cable system, the transport units are suspended from the supporting cable by a trolley and/or a clamp and do not rest on any supporting structure below. The second type of system corresponds to rail transportation systems wherein the transportation units are directly supported by rails or by a trolley that, in turn, is supported by rails. This last type of rail system can be additionally divided into two sub-groups depending on whether the rails are in any case raised from the ground or the rails are at ground level, and in both cases (according to certain of the prior art) the transport units rest on a special trolley below that, in turn, rests on the rails.

For the purposes of this disclosure, the term "rail transportation system" refers to both these two categories wherein the rails may either be in a raised position or at ground level.

The choice of one type of system or the other (cable or rail) mainly depends on the shape of the path to be covered, which can indeed have only planimetric or only altimetric profiles, or a combination of both, with straight sections but with relative steep gradients or with curved sections but basically flat.

The functional choice for the use of a cable system or a rail system can be summarised as follows; If the planimetric path comprises curved and straight sections but without significant slopes (typical urban setting), it is preferable to use a rail transportation system; If the planimetric path comprises relatively steep gradients and significantly different slopes (but mainly with rectilinear sections), it is preferable to use a cable transportation system.

Currently, in the event of hybrid paths (i.e., with sections that would be suitable for cable transportation followed by sections that, in contrast, would be suitable for rail transportation), it is known to arrange two different systems in succession wherein, while sharing an intermediate interchange station, users are requested to change transportation units so as to transfer from one system to the other. Even if the systems are adjacent, it is in any case relatively inconvenient for passengers due to the transfer from one system to the other.

PCT Patent Application No. WO2015/077806 describes a transportation system wherein the transportation units travel without transport interruption along the path presenting, in succession, cable system portions and rail system portions, especially with rails raised from the ground. According to PCT Patent Application No. WO2015/077806, the transportation units of the cabin type comprise a roof to which a first trolley, configured to be supported by the load-bearing cables, is externally attached and to enable the transport units to advance along the system portion configured as a cable system. The exchange from a cable path portion to a rail path portion takes place in the station where the transportation units are usually already detached from the cables and advance supported, suspended from special upper tracks. Before leaving the station, the first trolley, attached to the roof of the cabin, couples to a second trolley motor or motorized trolley resting on these upper rails. Outside the station, the rail system section rails are merely the continuation of the upper rails of the interchange station. Hence, in this configuration the transportation units are supported, suspended from the rail by the second trolley and suspended below in the air with their first trolley coupled to the second motorised trolley. As a result of the motorization of the second motor trolley, the transportation units move along the tracks and travel (always raised) along the rail path section. Therefore, according to PCT Patent Application No. WO2015/077806 the transportation units used on the cable system section are transported in their entirety (i.e., with the corresponding first trolley) by the second trolley along the rail transportation section. This solution, while eliminating the transfer of passengers between the different systems, has some drawbacks, with particular reference to the path portion with rail transportation. First of all, this solution does not provide for the possibility that the rail system section may be placed at ground level. In addition, the solution described in PCT Patent Application No. WO2015/077806 expressly provides that the first trolley (i.e., the one that operates along the cable section) is transported along the rail section. This moving mass, which is not necessary in itself, limits the dynamics of the system as well as resulting in relatively much greater dimensions than required in a classic rail transportation system wherein the rail rests on the ground.

SUMMARY

In view of this background, one purpose of this disclosure is to implement a hybrid cable/rail transportation system capable of overcoming certain of the drawbacks highlighted in certain of the known art.

In accordance with these purposes, this disclosure relates to a hybrid cable/rail transportation system comprising a plurality of transportation units; wherein each transportation unit comprises a cabin provided with a roof and a floor. The system of this disclosure is described as hybrid because it comprises at least one system portion configured as a cable transportation system, with at least one supporting cable, and at least one system portion configured as a rail transportation system, with at least one rail. The passage from one system portion to the other occurs at an intermediate station wherein the hauling-supporting cable ends and wherefrom the track begins. This disclosure also provides for the opposite possibility wherein the rail system portion is upstream of the intermediate station and the cable system portion is downstream thereof. In certain embodiments, inside the station the supporting cable is replaced by an upper track that has the function of supporting the cabin in a suspended configuration for at least one section of the station.

The movement of the cabins in the cable or rail system sections can be controlled in various ways, for example it is possible to provide for a hauling cable or specific driving means directly integrated in the transportation units (for example motorised trolleys) or through linear actuators.

According to certain aspects of this disclosure, each cabin is configured for being moved along the entire system and the passengers do not need to transfer cabins in passing from one system portion to the other. Indeed, each cabin is configured for being selectively supported by one first trolley along the system portion configured as a cable transportation system and supported by a second trolley along the system portion configured as a rail transportation system. In the system portion configured as a rail transportation system, the latter can be at ground level (i.e., the transportation units rest directly on the second trolley) or the rail can be in a raised position.

According to certain aspects of this disclosure, each cabin has a selective coupling system configured to couple the cabin to the first trolley along the system portion configured as a cable transportation system and to the second trolley along the system portion configured as a rail transportation system, wherein this coupling system is attached to the roof of the cabin. Advantageously, in this way the first trolley is not also moved along the rail system section and, therefore, since there is less moving mass, the dynamics of the system are improved in terms of dynamic performance and loads weighing on the structure.

In cases where the rail section involves a rail that is suspended or above the ground, the second trolley comprises a frame attached to the rail and configured to support the cabin (and not also the first trolley) in a configuration suspended in air.

In cases where the rail section involves a ground level rail, the second trolley comprises a first frame portion coupled to the rail and a second frame portion that extends vertically from the first frame portion to a position where it can be coupled to the selective coupling system provided externally to the roof of the cabin. In this configuration, the cabin is only attached to the second trolley above with the floor not resting on any structure but separated and facing the first frame portion of the second trolley that rests on the rails.

The mechanical configuration of the selective coupling system provided on the roof of the cabin can be of any form as long as it can fulfil the functions of coupling to the first trolley, detaching from the first trolley, coupling to the second trolley, and detaching from the second trolley. It is also possible to arrange the coupling system so that there is a brief period of time in which the cabin is coupled both to the first and to the second trolley to enable a comfortable passage from one section of the system to the other. The selective coupling system may comprise separate coupling devices, or a first coupling device configured to be selectively coupled to the first trolley and a separate coupling device configured to be selectively coupled to the second trolley. Alternatively, the selective coupling system may comprise a single body or device that has a first portion configured to be selectively coupled to the first trolley and a second portion that is of a single piece with the first and configured to be selectively coupled to the second trolley. With reference to the coupling between the cabin and the second trolley, it is possible to arrange the coupling configured to enable relative rotations (for example, pitch and/or roll rotations that may be cushioned) to, in certain embodiments, always keep the cabin itself (especially the floor of the cabin) horizontal. For example, the coupling system of the second trolley may be installed on the rocker arm attached to the second trolley itself. This aspect improves the relative comfort of travel, including when there are variations in height (or small sections in ascent or descent) along the system's rail portion.

In addition, the structure of the second trolley is also configured to travel along the rail and to attach itself to the roof of the cabin and may assume many different forms. In certain embodiments of the disclosure, one form of this second trolley is particularly suitable for enabling the cabin support to be exchanged from the first to the second trolley. For example, the second trolley may comprise a platform equipped with wheels coupled to the rail and a pair of gantry or bridge supporting structures (or structures basically U-shaped at the sides of the cabin), with each of the two vertical sections or uprights rising from the platform beyond the roof of the cabin, and a horizontal section or longitudinal crossbar that runs parallel to the roof (and in the cabin's forward direction) to be coupled to it. It is possible to provide a transverse crossbar to join the two gantries at the upper edge of the front of the cabin. On the opposite side (or on the front of the cabin) there is no crossbar that joins the gantries so as to create a structure that is open above in the forward direction to enable the corresponding longitudinal movement of the cabin on the second frame of the second trolley. This configuration makes it possible to pass, without intermediate steps, from the coupling with one trolley to the other. The gantry structures may also be completed with panels or other structures configured to avoid contact between the cabins closely arranged alongside each other and to protect passengers from falling on the boarding/disembarking plane. For this purpose, the second trolley may be equipped with a footboard fixed on the support to reduce the distance between the walking plane in the cabin and in the station. In certain embodiments, the platform may be detached from the supporting structure to enable cabins with different shapes to be supported. In certain embodiments, the supporting structure of the second trolley has a shape that can accommodate the cabin even when it is still attached to the first trolley, to enable a relatively smooth passage from the first to the second trolley.

The coupling and the uncoupling of the trolleys may occur when the cabin is still or moving. In certain embodiments, this coupling/uncoupling is carried out along a straight section of forward movement in the station. In general, the way the system continues with the cabin always suspended above and in the air offers another element of transport comfort: the people inside the cabin do not even notice the passage from one system section to the other, and the cabin is not subject to relative leaps or jerks.

To make the passenger's disembarkation from the cabin comfortable, when it is supported suspended from the second trolley, it is possible to provide stabilizing devices on board of the second trolley configured to lock or dampen the cabin's corresponding movements. For example, to limit or block rotations that normally occur during passengers' disembarkation or boarding, pushers (or pneumatic pistons) may selectively project from the platform of the second trolley that, from below, support and lock the floor of the cabin.

BRIEF DESCRIPTION OF THE DRAWINGS

Further features and advantages of this disclosure will be apparent from the following description of a non-limiting embodiment thereof, with reference to the figures of the accompanying drawings, wherein.

DETAILED DESCRIPTION

This disclosure relates to a hybrid cable/rail transportation system.

Figure 1:
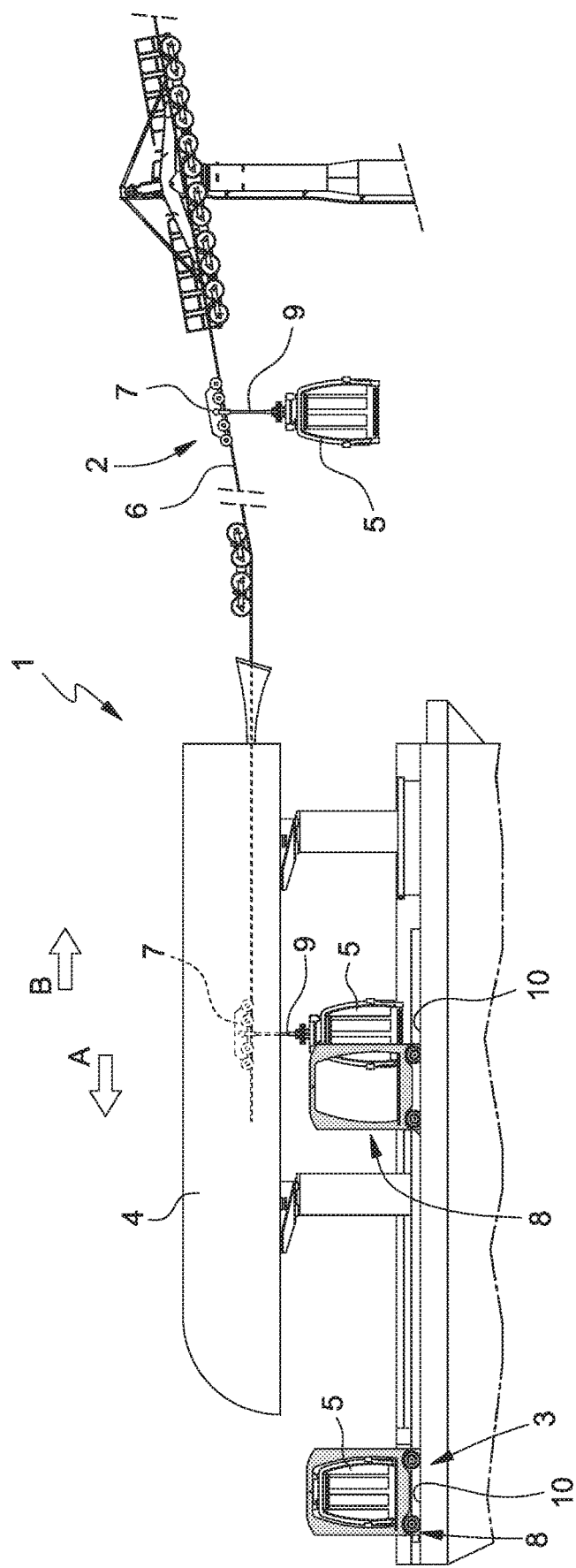
FIG. 1 is a schematic view of a portion of a hybrid cable/rail transportation system according to this disclosure.

In particular, FIG. 1 shows a schematic view of a portion of a hybrid cable/rail transportation system (schematized with reference numeral 1) according to this disclosure. This Figure shows a system portion configured as a cable transportation system, identified, in general, with reference numeral 2, and a system portion configured as a rail transportation system, identified, in general, with reference numeral 3. These two different system configurations are connected to each other at an intermediate station 4 wherein the cabin 5 enters supported in a certain way and exits supported in another. The arrows A and B designate how, according to this disclosure, the travel direction of the system may be interchangeably oriented so as to pass from a cable support to a rail support, or vice versa. In different embodiments, the system may be of a "to and fro" type with only one ascent and descent branch or it may have parallel ascent and descent branches. For the purposes of this disclosure, the operating motion both along the cable section and the rail section may be of any type, namely it can provide for a hauling cable or suitable driving means integrated in the trolleys present in the sections of the system. As schematized in FIG. 1, the system portion configured as a cable transportation system 2 comprises a supporting cable 6 that also acts as a hauling cable in this portion of the system. The cabin 5 is supported along the cable system portion so it is suspended in air (i.e., not resting, below, on any structure) by a first trolley 7 coupled to the supporting cable 6 and equipped with a support arm 9 connected to the roof of the cabin 5. According to this disclosure, alternative cable systems may be provided with several supporting cables and, possibly, a hauling cable. Although the term "trolley" is in practice more suitable for systems with two load-bearing cables, according to this disclosure, the term first trolley also refers to the single clamping device included for those single-cable systems. In the system portion configured as a rail system 3 the cabin 5 is supported by a second trolley 8 which is itself supported resting on a rail 10. As will emerge in the description of the following figures, the cabin 5 of the rail section 3 is a cabin 5, previously moving along the system's cable section, which has detached from the corresponding first trolley 7 and is coupled with the second trolley 8.

Figure 2:
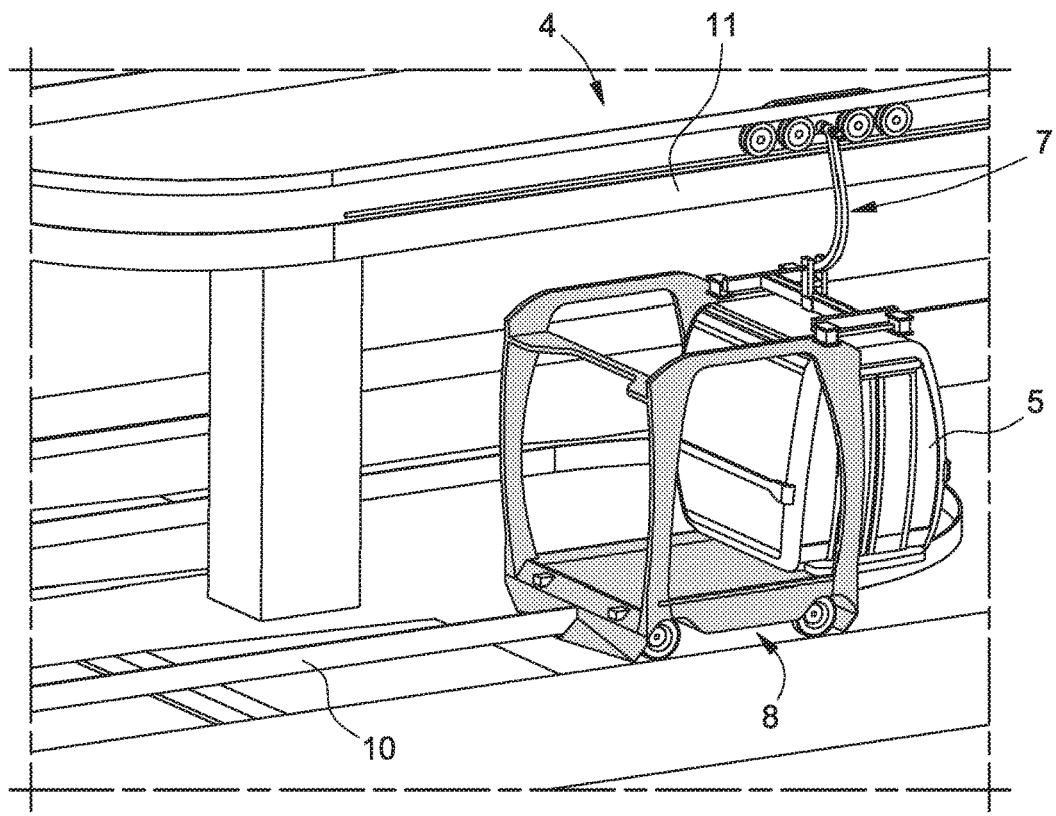
FIGS. 2, 3 and 4 are schematic views of subsequent operating steps of the system in FIG. 1.
Figure 3:
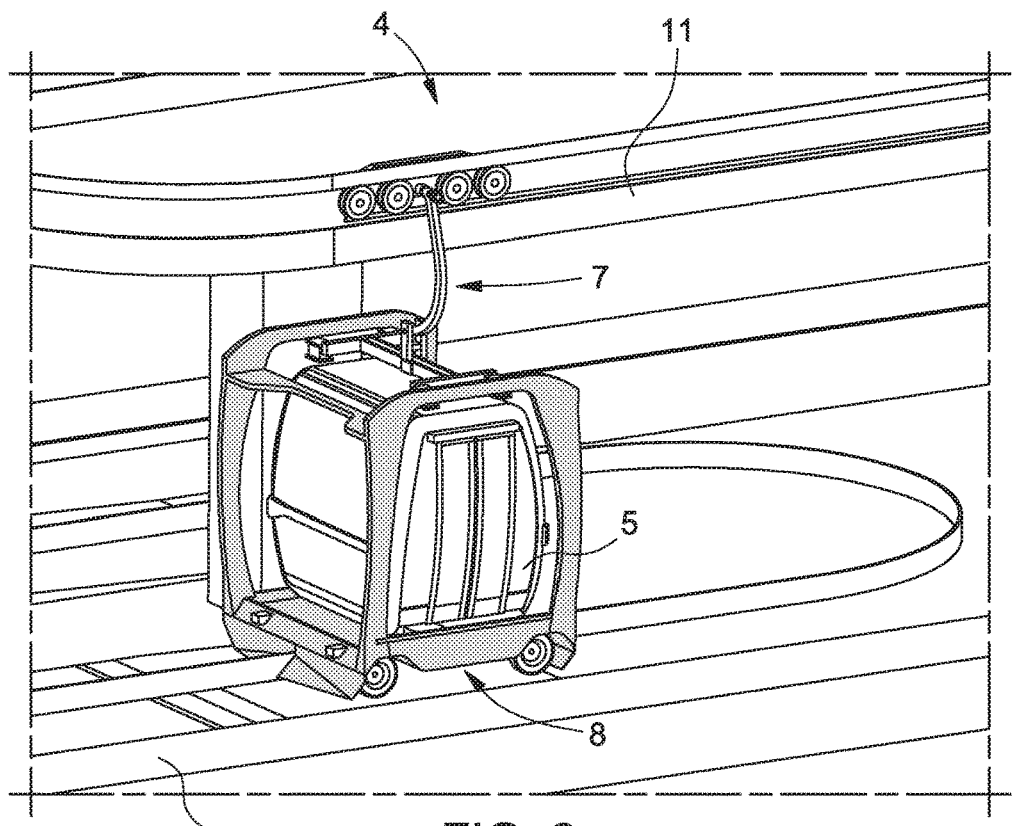
Figure 4:
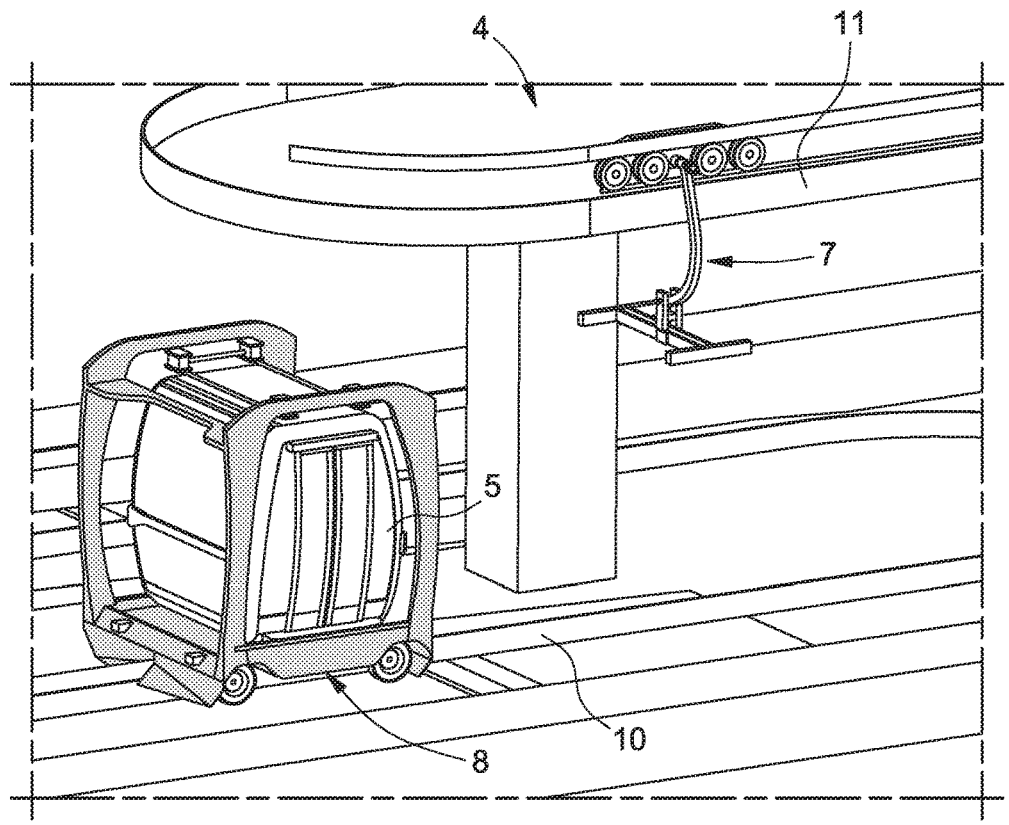

FIGS. 2 to 4 are schematic views of the subsequent operating steps of the system in FIG. 1, showing, in particular, the operation of the system inside the station 4 wherein the cabin 5 detaches from the corresponding first trolley 7 and couples with the second trolley 8. FIG. 2 shows a cabin 5 that enters the station 4 after having travelled along a cable system portion 2. Inside the station the function of supporting the cabins in a suspended configuration is ideally transferred from the load-bearing cable 6 to an upper track 11 supporting the first trolley 7. At the entrance to the station 4, the cabin, thus, is moved, supported suspended from the upper track 11, along a path wherein below the floor of the cabin 5 lies the first section of the rail 10 (which may be a single rail, a pair of tracks or another rail configuration), which will then continue outside the station 4 along the rail 3 system portion. As can be seen, there is a second trolley 8 inside the station, supported resting on the rail 10 and ready to receive the cabin 5. FIG. 3 shows a successive step wherein the cabin 5 still attached to the first trolley is moved forward until it reaches the second trolley 8. FIG. 3 shows a step wherein, on one side, the coupling with the second trolley 8 begins and, on the other side, the release steps for the first trolley 7 begin. In this step, the two trolleys can move forward with the cabin with synchronous motion or the exchange can occur with the cabin stopped. In this example, the cabin 5, before detaching itself from the first trolley 7, couples with the second trolley 8 and then proceeds for a short section, such as straight, with a double support. Once the coupling with the second trolley 8 is ensured, the cabin 5 detaches itself from the first trolley 7 that continues in plan view along a different path from that of the cabin 5 supported by the second trolley 8. FIG. 4 schematically shows the configuration wherein the cabin 5 is no longer supported by the first trolley 7 and proceeds supported by the second trolley 8. In certain embodiments, the first trolley 7 is sent back to the station 4 and, before leaving this station, is coupled with another cabin that travels along the system in the opposite direction and has just travelled along a previous rail system portion 3.

Figure 5:
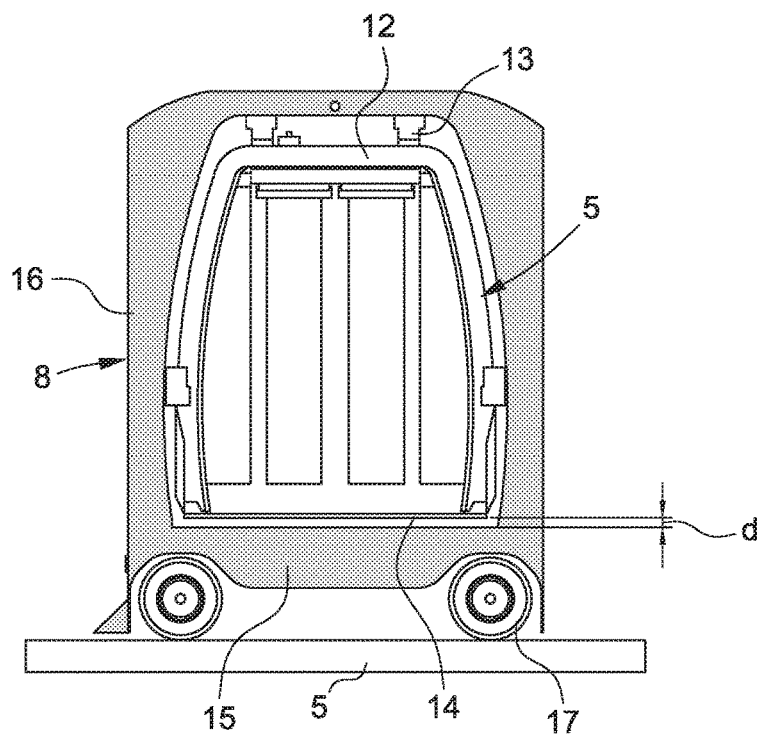
FIG. 5 is an enlarged schematic view of the cabin in the configuration in FIG. 4.

FIG. 5 shows an enlarged schematic view of the cabin in the configuration of FIG. 3, wherein it is coupled with the second trolley 8. As described herein, this second trolley 8 is configured to support the cabin 5 along the rail section 3. As can be seen in FIG. 5, the second trolley 8 is configured to support the cabin 5 so that it is suspended in the air, or below with the floor 14 not resting on any support. As also shown, the second trolley 8 is configured to couple to corresponding coupling devices 13 provided on the roof 12 of the cabin 5. For this purpose, the second trolley 8 comprises a first frame portion 15 coupled to the rail 5 and a second frame portion 16 that extends from the first portion 15 until it reaches the roof 12 of the cabin 5. In this example, the first frame portion 15 comprises a platform provided with wheels 17 wherein, during use, there is a distance d between the floor 14 of the cabin 5 and the platform itself. As shown, the second frame portion 16 comprises a pair of U-shaped support gantries or bridge structures equipped with two vertical sections or uprights that extend vertically from the platform beyond the roof 12 of the cabin and of a horizontal crossbar that orthogonally joins the uprights and that runs parallel to the roof 12 at the coupling devices 13. This crossbar, for each gantry, is, equipped with corresponding devices configured to couple to the coupling devices 13. In addition, there is also a horizontal crossbar frame portion that connects the two U-shaped gantries together in their upper portion at the front of the cabin (or that directly in the cabin's forward direction). On the opposite side (or at the front of the cabin) there is no crossbar that joins the gantries so as to create a structure that is open above in the forward direction to enable the corresponding longitudinal movement of the cabin 5 in the frame 16. This movement is, in certain instances, indispensable to enable the cabin 5 to be coupled to the trolleys 7 and 8. The vertical sections or uprights that extend vertically from the platform beyond the roof 12 of the cabin are shaped so as to create an anti-intrusion barrier for passengers waiting in the stations when the vehicles are sitting alongside each other. This disclosure is not limited to how this coupling is practically implemented (i.e., the person skilled in the art will certainly have the knowledge to implement this coupling) nor is it limited to the shape of the second trolley that is shown. Any geometry is possible as long as a support for the cabin on the roof is ensured, with the floor not resting on any supporting structure.

Lastly, it is clear that modifications and variations may be made to the disclosure described herein without departing from the scope of the appended claims. As such, the present disclosure also covers embodiments that are not described in the detailed description and equivalent embodiments. Accordingly, various changes and modifications to the presently disclosed embodiments will be apparent to those skilled in the art.

The invention claimed is:

1. A hybrid transportation system comprising:
   a cable transportation system portion comprising a supporting cable;
   a rail transportation system portion comprising a rail, wherein the cable transportation system portion is at least one of: upstream of the rail transportation system portion, and downstream of the rail transportation system portion;
   a first trolley coupled to the supporting cable;
   a second trolley coupled to the rail; and
   a transportation unit comprising a cabin comprising a roof and a coupling system attached to the roof, the coupling system configured to couple, independent of the second trolley, the cabin to the first trolley along the cable transportation system portion and configured to couple the cabin to the second trolley along the rail transportation system portion.

2. The hybrid transportation system of claim 1, wherein the cabin comprises a floor, and along the rail transportation system portion, the rail is below the cabin and facing the floor.

3. The hybrid transportation system of claim 1, wherein the second trolley comprises a first frame portion coupled to the rail and a second frame portion extending from the first frame portion to the roof of the cabin.

4. The hybrid transportation system of claim 3, wherein the second frame portion comprises a coupling device configured to be coupled to the coupling system, the second frame portion extending such that a floor of the cabin is spaced apart from the first frame portion.

5. The hybrid transportation system of claim 3, wherein the second frame portion is configured to be removed from the first frame portion.

6. The hybrid transportation system of claim 3, wherein the second frame portion is configured to house the cabin when the coupling system is coupled to the first trolley.

7. The hybrid transportation system of claim 6, wherein the second frame portion comprises at least one pair of U-shaped gantry supporting structures, each U-shaped gantry supporting structure comprising two uprights vertically extending from the first frame portion and a longitudinal crossbar connecting the two uprights and configured to support a coupling device configured to be coupled to the cabin.

8. The hybrid transportation system of claim 7, wherein the uprights extend beyond the roof of the cabin when the cabin is coupled to the second trolley, the uprights are shaped to avoid contact between a plurality of cabins of a plurality of transportation units arranged beside another and the uprights are configured to protect passengers during boarding/disembarking the cabin.

9. The hybrid transportation system of claim 3, wherein the second frame portion comprises a crossbar transversally connecting two gantries at a front of the cabin.

10. The hybrid transportation system of claim 1, wherein the coupling system is on a rocker arm configured to enable pitch rotations between the cabin and the second trolley.

11. The hybrid transportation system of claim 1, wherein the coupling system is configured to enable a simultaneous coupling to the first trolley and to the second trolley.

12. The hybrid transportation system of claim 1, wherein the second trolley comprises a stabilizing device configured to selectively limit movement between the cabin and the second trolley.

13. The hybrid transportation system of claim 1, wherein the second trolley comprises a footboard configured to create a continuous walking plane between a floor of the cabin and a station platform.

14. A rail trolley configured to be coupled to a rail of a rail transportation system portion of a hybrid transportation system, the rail trolley comprising:
   a first frame portion;
   a second frame portion extending from the first frame portion to a roof of a cabin of a transportation unit; and
   a coupling device attached to the second frame portion, the coupling device configured to be coupled to a coupling system attached to the roof of the cabin of the transportation unit, the coupling system configured to couple the cabin to the rail trolley along the rail transportation system portion and configured to couple, independent of the rail trolley, the cabin to a cable trolley coupled to a supporting cable along a cable transportation system portion of the hybrid transportation system.

15. The rail trolley of claim 14, wherein the second frame portion extends such that a floor of the cabin is spaced apart from the first frame portion.

16. The rail trolley of claim 14, wherein the second frame portion is configured to house the cabin when the coupling system is coupled to the cable trolley.

17. A hybrid transportation system transportation unit comprising:
   a cabin comprising a roof; and
   a coupling system attached to the roof, the coupling system configured to couple, independent of a second trolley coupled to a rail of a rail transportation system portion of the hybrid transportation system, the cabin to a first trolley coupled to a supporting cable of a cable transportation system portion of a hybrid transportation system and configured to couple the cabin to the second trolley coupled to the rail of the rail transportation system portion of the hybrid transportation system.

18. The hybrid transportation system transportation unit of claim 17, wherein the cabin comprises a floor and along the rail transportation system portion, the rail is below the cabin and facing the floor.

19. The hybrid transportation system transportation unit of claim 17, wherein the coupling system is on a rocker arm configured to enable pitch rotations between the cabin and the second trolley.

20. The hybrid transportation system transportation unit of claim 17, wherein the coupling system is configured to enable a simultaneous coupling to the first trolley and to the second trolley.

\* \* \* \* \*